United States Patent

Keldenich et al.

[11] Patent Number: 5,983,811
[45] Date of Patent: *Nov. 16, 1999

[54] METHOD AND ROLLER GRILL FOR BURNING REFUSE

[75] Inventors: Kai Keldenich, Essen; Jurgen Scheffler; Peter Grell, both of Oberhausen; Othmar Frielingsdorf, Hofheim am Taunus, all of Germany; Colin Peter Robson, New Malden, United Kingdom

[73] Assignee: Deutsche Babcock Anlagen GmbH, Oberhausen, Germany

[*] Notice: This patent is subject to a terminal disclaimer.

[21] Appl. No.: 08/945,397
[22] PCT Filed: Mar. 18, 1996
[86] PCT No.: PCT/EP96/01153
  § 371 Date: Nov. 7, 1997
  § 102(e) Date: Nov. 7, 1997
[87] PCT Pub. No.: WO96/29539
  PCT Pub. Date: Sep. 26, 1996

[30] Foreign Application Priority Data

Mar. 21, 1995 [EP] European Pat. Off. .............. 95104113

[51] Int. Cl.⁶ .............................. F23K 3/08; F23H 9/02; F23H 1/02
[52] U.S. Cl. .......................... 110/346; 110/248; 110/268; 110/276; 110/298; 110/300; 110/311; 110/348; 126/152 B; 126/152 R; 126/163 R; 126/181

[58] Field of Search ..................... 110/192, 248, 110/251, 255, 257, 297, 298, 267, 268, 275, 276, 286, 309, 311, 312, 346, 348, 299; 126/152 R, 152 B, 163 R, 181

[56] References Cited

U.S. PATENT DOCUMENTS

| | | | |
|---|---|---|---|
| 2,367,590 | 1/1945 | Lewers et al. | 110/248 |
| 3,812,794 | 5/1974 | Taylor | 110/257 X |
| 5,042,401 | 8/1991 | Ettehadieh | 110/275 X |
| 5,405,537 | 4/1995 | Goff et al. | 110/346 X |
| 5,448,957 | 9/1995 | Goldammer et al. | 110/275 X |

*Primary Examiner*—Carl D. Price
*Assistant Examiner*—Ljiljana V. Ciric
*Attorney, Agent, or Firm*—Max Fogiel

[57] ABSTRACT

A roller grate arrangement for garbage-incinerating plants, in which a plurality of rollers with horizontal and parallel axes lie in an inclined plane. Primary air is fed to interiors of the rollers by air boxes located below the grate. The rollers have surfaces with air gaps for supplying the primary air, and the rollers are positioned to form a space between adjacent rollers. A component in the space between adjacent rollers, bridges the space between adjacent rollers. The component is free of air passages. Blast pipes are positioned in spaces between adjacent rollers and are connected to a separate system for feeding supplemental air.

15 Claims, 3 Drawing Sheets

METHOD AND ROLLER GRILL FOR BURNING REFUSE

BACKGROUND OF THE INVENTION

The present invention concerns a method of and a roller grate for burning garbage. A layer of garbage is burned on a grate while continuously conveyed along it. Primary air is supplied to the garbage through the grate from below.

SU 1 756 741 A1 describes a roller grate wherein every intermediate component comprises a system of stationary bars with gaps between them. Accommodated below the intermediate components are air boxes. Air is supplied to the boxes by a fan that is independent of the primary-air system, The particular object is to improve burn-up.

As far as is known, the approach suggested in this reference has never been applied to garbage incinerators. Specifically, supplemental air is not supplied to the nips or spaces between the rollers in the roller-grate combustion systems currently known and being built. All of the primary air supplied to the fuel bed arrives through the surfaces of the rollers.

The layer of fuel in the vicinity of the nip or space is considerably thicker than in the areas where it rests against the rollers. The fuel also has a tendency to become denser in the vicinity of the gaps, where there the material is finer. A lot of air is accordingly needed in these areas. The increased impedance offered by the garbage resting there on the other hand forces the primary air out of the nips or spaces and into the regions when the layer is thin and loose, at the edges of the grate for example.

To improve burn-up in the incineration of garbage, the combustion air in the migrating-grate furnace specified in U.S. Pat. No. 3,403,643 is enriched with 25 to 50% oxygen. It is doubtful, however, whether such enrichment is possible in practice. Even a slight increase in the percentage of oxygen will increase the temperature beyond the materials-dictated thresholds. Furthermore, increasing the oxygen to the aforesaid extent would make the process unacceptably expensive.

EP 0 496 325 B1 describes, with reference to a roller-grate furnace by way of example, a method whereby the combustion temperature and a volume of steam are supposed to be maintained essentially constant. The flow of garbage is controlled in accordance with a measured volume of steam. An extinguishing liquid consisting of water, sewage, or sludge is sprayed into the furnace. Primary and secondary air are enriched with oxygen in accordance with the liquid's rate of flow. From one of the examples it is evident that enrichment to approximately 50% results in a lot of oxygen being consumed. A garbage-combustion rate of 800 tonnes a day requires approximately 600 tonnes a day of oxygen. Even a relatively low enrichment of less than 24% requires more than 100 tonnes a day of oxygen to burn just 500 tonnes a day of garbage.

SUMMARY OF THE INVENTION

One object of the present invention is accordingly a method of burning considerably more garbage at little additional cost whereby the temperature will not increase beyond the materials-dictated threshold.

It is the supplemental air, of which there is much less than primary air, that is enriched with oxygen in the present method. Much more oxygen is provided to the vicinity of the narrower areas, and the layer of garbage is loosened, improving contact between the particles of fuel and the oxygen. The fire is fanned in the narrower areas and becomes much more intense, acting as ignition for the garbage resting above it. It accelerate combustion and contributes to the efficiency of the furnace.

BRIEF DESCRIPTION OF THE DRAWINGS

The present invention will now be specified with reference to the example of a roller grate in a furnace appropriate for carrying out the method in accordance with the present invention and illustrated in the accompanying drawing, wherein.

DESCRIPTION OF THE PREFERRED EMBODIMENTS

Figure 1:
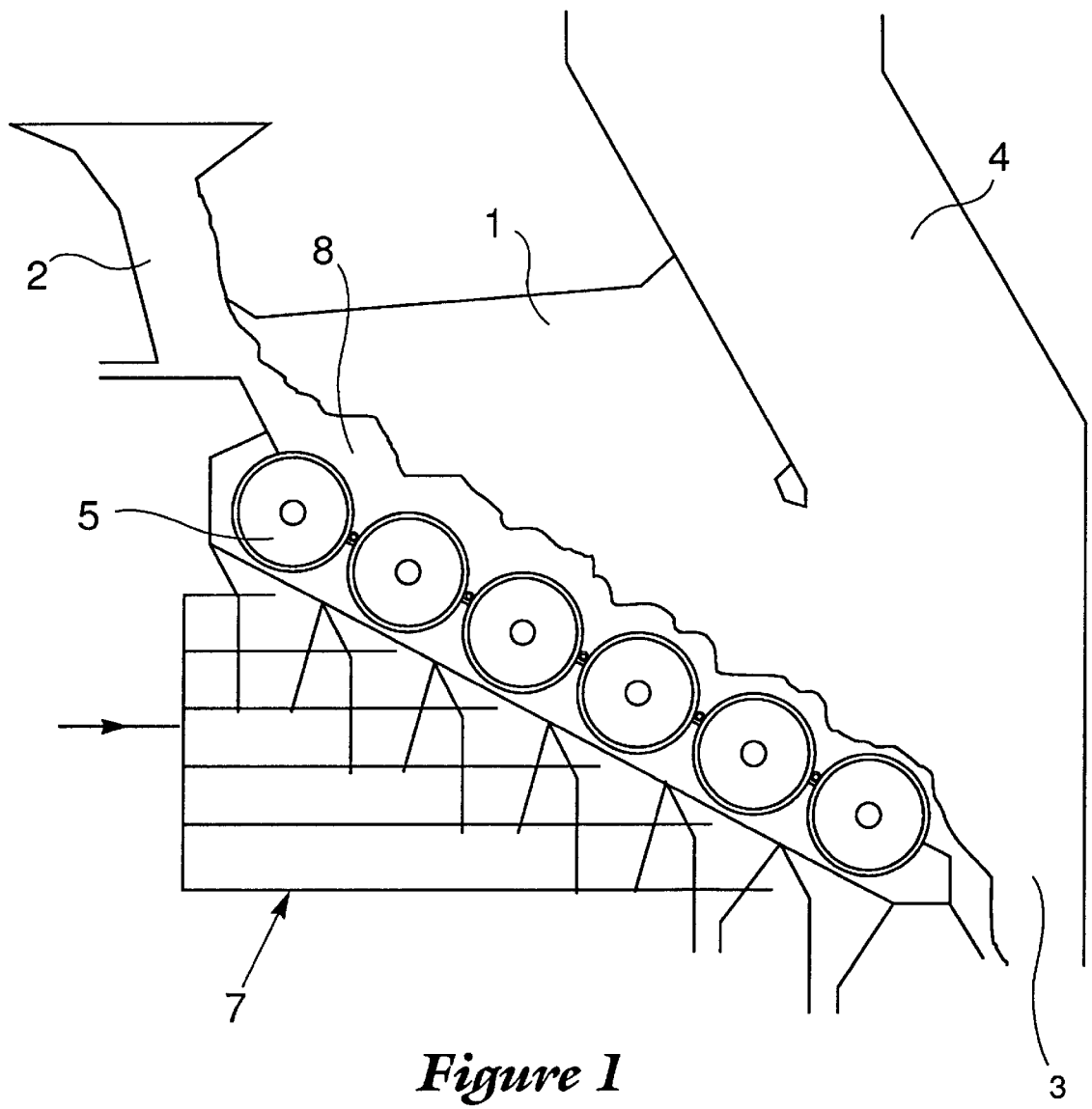
FIG. 1 is a schematic side view of a roller grate.
Figure 2:
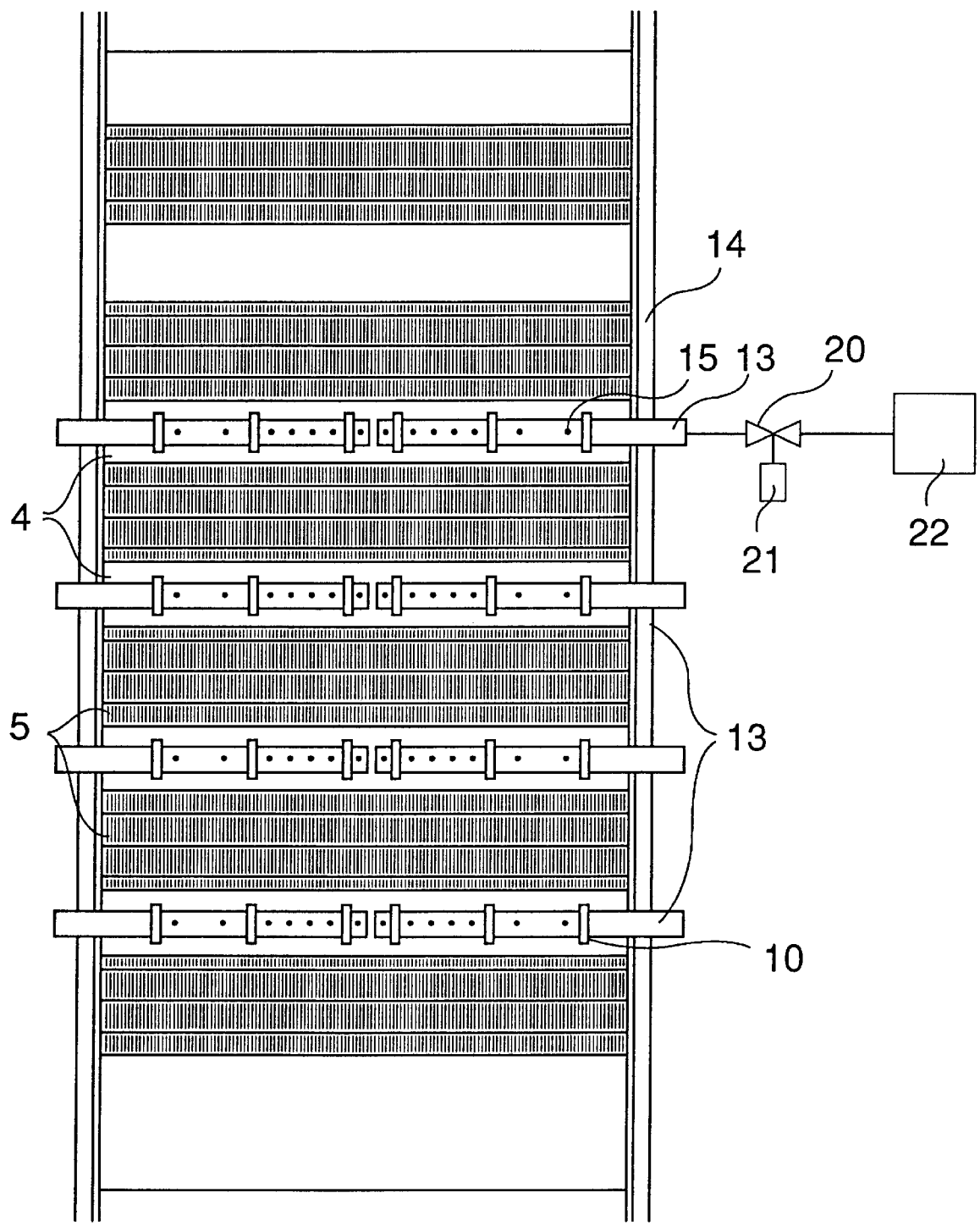
FIG. 2 is a top view of the same grate.
Figure 3:
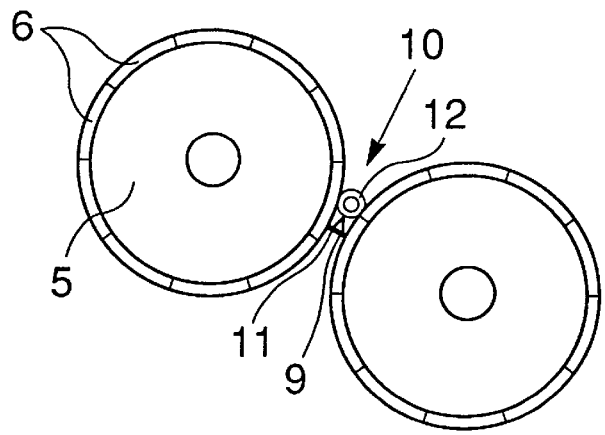
FIG. 3 is an enlarged detail of FIG. 1.

A furnace 1 in a garbage-incinerating plant illustrated in FIG. 1 is provided with a fueling hopper 2, an ash-removal shaft 3, and a flue-gas extractor 4. The floor of furnace 1 is in the form of a grate comprising six rollers 5 approximately 1.5 m in diameter. The axes of rollers 5 extend horizontal and parallel in a plane inclined approximately 20 to 30 ° down toward ash-removal shaft 3. The surface of rollers 5 consists, as will be evident from the figure, of bars 6, each extending along a curve of 36°, ten bars 6 accordingly constituting a closed ring. Each bar 6 is about 5 cm wide. Between each pair of adjacent bars 6 is a gap of approximately 2 to 3 mm. Each roller is rotated by a drive mechanism at a continuously variable speed of 0.6 to 12 rotations an hour. Below the grate is a system essentially consisting of air boxes 7 that supply primary air to rollers 5. The flow of primary air to each roller 5 can be separately controlled. The distribution of primary air to the rollers matches the need of each area of the grate. Most of it is supplied to the area of major combustion, in the vicinity of the second, third, and fourth rollers. Resting on rollers 5 is a schematically represented non-uniform layer 8 of fuel. The space between each pair of adjacent rollers 5 is narrow in comparison to the diameter of the rollers and bridged by a slender strip-shaped intermediate component 9. The diameter of each intermediate component 9 is approximately $\frac{1}{5}$ to $\frac{1}{10}$ that of the rollers. There is no way for air to get through.

Several separated holders 10 are secured to intermediate components 9. Each holder 10 comprises a foot 11 and a ring 12. Rings 12 loosely accommodate blast pipes 13. Each blast pipe 13 is made of heat-resistant steel and its diameter is between 20 and 120 mm. They extend more or less into the middle of the furnace through its lateral walls. Blast pipes 13 are closed at their free ends at the middle of the rollers. They are rotated around their longitudinal axes by an unillustrated mechanism outside the furnace. Distributed along each blast pipe 13 are several blast openings 15 that open upward vertically or at an angle. Each pair of openings is separated 50 to 1000 mm. The diameter of each opening is 2 to 20 mm. The ratio of diameter to distance ensures that the sum of the areas of the openings per meter of blast-pipe length is at least 0.5 cm² but no more than 10 cm² and preferably no more than 5 cm². Each blast pipe 13 in one preferred embodiment of the present invention is 2.5 m long and has ten openings, each 0.6 cm wide, uniformly distributed along it. The two blast pipes 13 accommodated in a single nip or space accordingly have a total blast cross-section of just 6 cm². The openings can, however, alternatively differ in width and/or be distributed at varying distances along the pipe. They can also be positioned at different locations in different pipes in the same grate. It will be practical for them to be arranged and dimensioned such that the width of the openings per meter of blast pipe is greatest in the vicinity of the highest demand for oxygen, meaning at the middle of the rollers and especially in the nips or spaces between the second and third and between the third and fourth. The pipes can be left out of the nips downstream of the first and between the fifth and sixth rollers.

Figure 4:
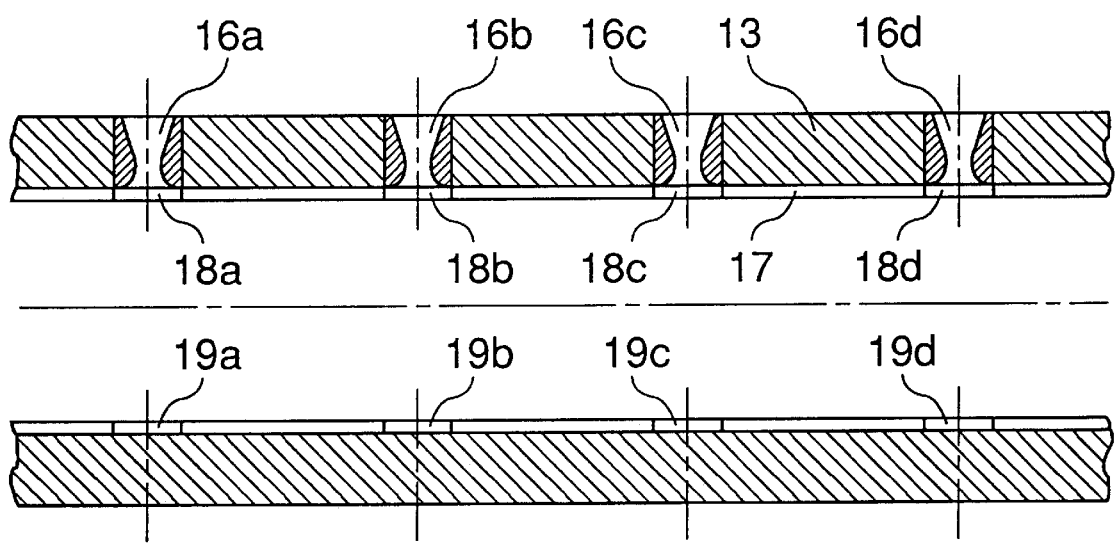
FIG. 4 is a section through part of a blast pipe.

The blast openings in the embodiment illustrated in FIG. 4 constitute Laval nozzles 16*a*–16*d*. An inner pipe 17 slides into and out of each blast pipe 13 in this embodiment and has several rows of openings 18*a*–18*d* and 19*a*–19*d* in its circumference. In the illustrated state, openings 18*a*–18*d* communicate with Laval nozzles 16*a*–16*d*. If, however, inner pipe 17 is rotated 180° around its axis, openings 19*a* and 19*b* will communicate with Laval nozzles 16*a* and 16*b*. Since openings 19*c* and 19*d* are displaced in relation to Laval nozzles 16*c* and 16*d*, the latter will be closed off in this state. Laval nozzles 16*a* and 16*b* can be blocked and Laval nozzles 16*c* and 16*d* opened by sliding inner pipe 17 back and forth inside blast pipe 13.

Blast pipes 13 communicate with a supplemental-air system 22 through valves 20. Valves 20 are actuated by a timer 21. The pressure in the supplemental-air system is 0.05 to 1 MPa above that in the overall furnace. The system communicates with a reservoir of pure oxygen or oxygen-enriched air.

In operation, supplemental air, preferably heated and enriched with as much as 50% oxygen, is injected through blast pipes 13. Since the blast pipes are surrounded by garbage in the nips, the jets of air will reliably penetrate into the layer of garbage.

The device can be operated in various ways. When operated for example at an excess pressure of approximately 0.05 to 0.2 MPa, whereat the speed of the flow of supplemental air is considerably below the speed of sound, it is practical to inject the supplemental air continuously. In this event the blast pipes 13 will be periodically pivoted back and forth. The periodic change in the direction of the blast will considerably improve loosening.

The excess pressure in the supplemental-air system, however, can also be considerably higher, between 0.4 and 1 MPa, say, and preferably high enough to convey the supplemental air supersonically if the blast pipes 13 are provided with Laval nozzles. In this event it is recommended to inject the supplemental air discontinuously and in pulses. Such pulses will last for example between 10 and 100 seconds and the intervening intervals between 30 and 300 seconds.

The additional poking will break up agglomerations, and the surface of the particles will be more effectively provided with primary air, which will in turn be exploited to better advantage. These results can be attained with relatively small volumes of supplemental air. The ratio of supplemental air to primary air by volume can very well be 1:10 to 1:100 and preferably 1:10 to 1:30. When the ratio is 1:20 for example and the supplemental air is enriched 30% with oxygen, oxygen demand will be less than 0.6 of the primary air by volume.

Another advantage of the present invention when applied to roller grates is that less ash will fall through the nips.

We claim:

1. A method for burning garbage comprising the steps of: providing a roller grate comprising a plurality of rollers; conveying a layer of garbage on the roller grate in a longitudinal direction of said roller grate and burning said garbage on said roller grate; supplying primary air through air gaps in the outer surface of the rollers in said roller grate; spacing each two adjacent rollers to form an intermediate space; bridging said intermediate space with an intermediate component for preventing air flow through said intermediate space; supplying primary air through said rollers from below said garbage layer to burn said layer; independently of said primary air, blowing supplemental air enriched with oxygen into said layer via blast pipes in said intermediate spaces and immersed in said layer and independent of said primary air, said blast pipes being parallel to said rollers, whereby a ratio of a supplied amount of the oxygen-enriched supplemental air to a supplied amount of primary air has a value between 1:10 and 1:100.

2. A method as defined in claim 1, wherein said supplemental air is injected in intermittent pulses.

3. A method as defined in claim 2, wherein said supplemental air is injected at a pressure of 0.4 MPa to 1 MPa above ambient pressure.

4. A method as defined in claim 1, wherein said supplemental air is injected continuously.

5. A method as defined in claim 4, wherein said supplemental air is supplied in a direction which is periodically changed.

6. A method as defined in claim 4, wherein said supplemental air is injected at a pressure of 0.05 MPa to 0.2 MPa above ambient pressure.

7. A roller grate for garbage-incinerating plants, said roller grate comprising: a plurality of rollers with parallel axes lying along an inclined plane and having surfaces with gaps for supplying primary air; intermediate components disposed in spaces between adjacent rollers and bridging the spaces between said rollers; a first system for supplying primary air into the interiors of said rollers; a second system for supplying supplemental oxygen-enriched air to said spaces; blast pipes with axes parallel to said axes of said rollers, said blast pipes disposed in at least some of said spaces; said blast pipes having blast openings and communicating with said second system for supplying supplemental air.

8. A roller grate as defined in claim 7, wherein said oxygen-enriched air comprises air enriched with 25% to 50% oxygen.

9. A roller grate as defined in claim 7, including holders for securing said blast pipes to said intermediate components.

10. A roller grate as defined in claim 7, wherein said blast pipes are rotatable about said axes of said blast pipes.

11. A roller grate as defined in claim 7, wherein said blast openings comprise Laval nozzles.

12. A roller grate as defined in claim 7, wherein said blast openings are simultaneously closable.

13. A roller grate as defined in claim 7, wherein said blast openings are each closeable individually.

14. A roller grate as defined in claim 7, including timer-controlled valves between said blast pipes and said second system for supplying supplemental air.

15. An arrangement for burning garbage comprising: a roller grate comprising a plurality of rollers; means for conveying a layer of garbage on said roller grate in a longitudinal direction of said roller grate and for burning said garbage on said roller grate; means for supplying primary air through air gaps in the outer surface of the rollers in said roller grate; each two adjacent rollers being spaced to form an intermediate space; an intermediate component for bridging said intermediate space for preventing air flow through said intermediate space; means for supplying primary air through said rollers from below said garbage layer to burn said layer; independently of said primary air, blast pipes for blowing supplemental air enriched with oxygen into said layer via said blast pipes in said intermediate spaces and immersed in said layer, said blast pipes being parallel to said rollers, whereby a ratio of a supplied amount of the oxygen-enriched supplemental air to a supplied amount of primary air has a value between 1:10 and 1:100.

* * * * *